April 20, 1926.
J. KIPPER
MEAT MOLD
Filed May 24, 1923
1,581,640
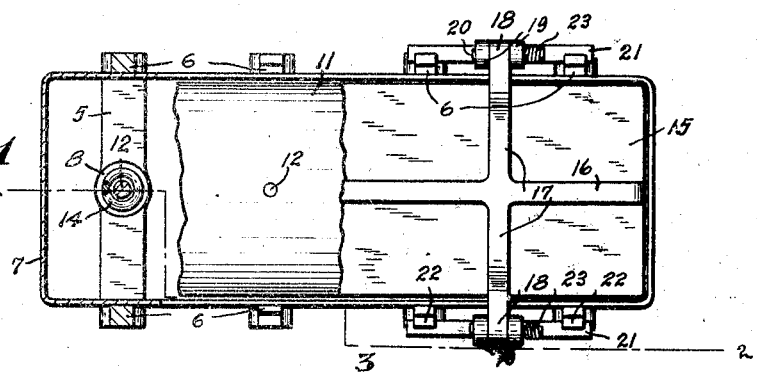
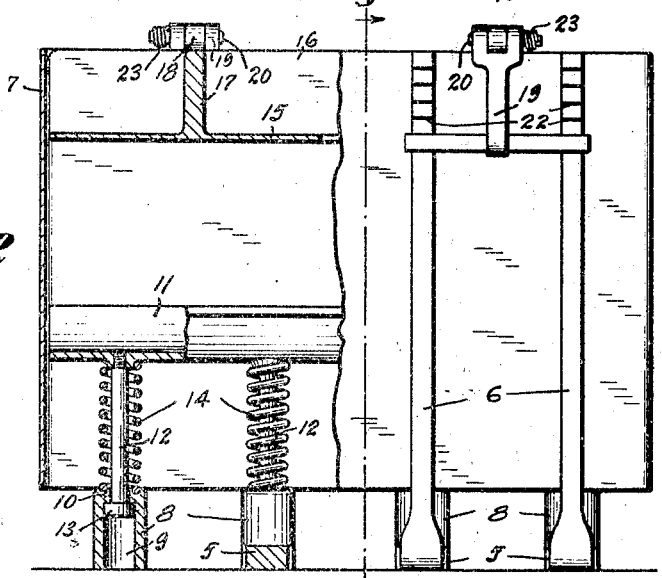
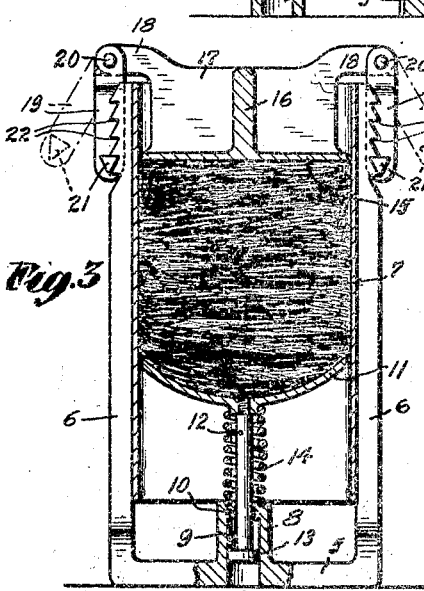
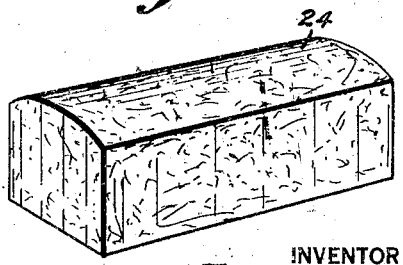
INVENTOR
Joseph Kipper
BY
Fred R. Matheny
ATTORNEY Patented Apr. 20, 1926.

1,581,640

UNITED STATES PATENT OFFICE.

JOSEPH KIPPER, OF SEATTLE, WASHINGTON.

MEAT MOLD.

Application filed May 24, 1923. Serial No. 641,115.

*To all whom it may concern:*

Be it known that I, JOSEPH KIPPER, a citizen of the United States, and a resident of Seattle, in the county of King and State of Washington, have invented certain new and useful Improvements in Meat Molds, of which the following is a specification.

My invention relates to improvements in meat molds, and the object of my invention is to provide a meat mold that will mold a meat loaf of substantially the same cross sectional shape as a loaf of bread.

Another object of my invention is to provide a meat mold for molding a meat loaf from whole hams and shoulders of pork from which the bones have been removed said mold being self adjusting to hams and shoulders of different size.

Another object is to provide a meat mold of this nature that may be conveniently operated by hand, and one in which the meat will be maintained under constant pressure regardless of shrinkage of the meat during cooking or treating processes.

Further objects are to provide a meat mold that is strong and compact in contruction, neat in appearance, easy to manipulate, not expensive to manufacture and one that is sanitary and easily cleaned and sterilized.

Other and more specific objects will be apparent from the following description taken in connection with the accompanying drawings.

In the drawings Figure 1 is a plan view looking down onto the top of a meat mold constructed in accordance with my invention, a portion of the cover being broken away to show the bottom plate and a portion of the bottom plate being further broken away to reveal parts of the construction below said bottom plate.

Figure 2 is a view partly in section and partly in side elevation substantially on a broken line 2—2 of Fig. 1.

Fig. 3 is a view in cross section on broken line 3—3 of Fig. 2, and Fig. 4 is a view in perspective on a reduced scale illustrating the shape of a meat loaf formed in this mold.

Like reference numerals designate like parts throughout the several views.

In preparing meat, especially hams, for the market, it is common practice to compress and cook the same in molds. These molds are usually shaped so that meat loaves of round or oval cross section and having rounded or ragged ends are produced. Loaves of this shape are extensively used for making sandwiches and are objectionable because a considerable amount of meat, which can only be sliced into small slices, must be cut from the ends in squaring up the loaf and because the body of the loaf is not of substantially the same cross sectional shape as a loaf of bread and the slices therefrom will not conform to the shape of the bread but will protrude outwardly around the edges thus making a ragged looking sandwich and giving the protruding edges of the meat a greater opportunity to dry out and come in contact with unsanitary objects. My invention overcomes both of these objections by providing a loaf having square ends of substantially the same cross sectional shape as a loaf of bread so that the slices will fit the bread.

In the drawings I have shown an external supporting frame consisting of four substantially U-shaped members each formed of a base portion 5 and two upper side portions 6. Secured within the upright side portion 6 is a rectangularly shaped housing or receptacle 7 that is open at both the top and bottom, the bottom preferably terminating at a distance from the base portions of the frame.

Integral with the base portion 5 of each frame member and extending upwardly therefrom is a centrally disposed boss 8 having a relatively large tubular bore 9 extending upwardly from the bottom and having a smaller bore or perforation 10 extending downwardly from the top and intersecting the bore 9.

A movable bottom 11 of concave shape is supported by bolts 12 that extend downwardly through the perforations 10 and have heads 13 slidably disposed in the bores 9 of the bosses 8. Compression springs 14 interposed between the upper ends of the bosses 8 and the lower sides of the concave bottom members 11 exert an upward pressure on said bottom members.

A substantially plane press member 15 provided with a longitudinal rib 16 and with transverse ribs 17 that extend upwardly from the top side thereof is adapted to be inserted in the upper end of the meat receptacle 7. The transverse ribs 17 are provided at each side with outwardly projecting extensions 18 to which latch arms 19 are secured by pivots 20. The latch arms 19 are provided at their lower ends with rigid transverse bars 21 preferably of triangular cross section that are arranged to engage with ratchet teeth 22 formed integral with the upper frame members 6. Springs 23 are provided, preferably in connection with the pivots 20, for urging the latch arms 19 inwardly to maintain engagement of latch bars 21 with ratchet teeth 22.

The latch bars 21 project in both directions from each latch arm 19 so that they engage with the frame members 6 on both sides of each of said latch arms.

In operation when the mold is empty the concave bottom plate 11 will be supported at the limit of its upward movement as shown in Fig. 2. When meat, as a ham, is prepared and placed in the mold it will rest on the bottom plate 11 and may be compressed by placing the press member 15 on the top thereof and forcing the same downwardly into the mold. Downward movement of the concave bottom 11 will be limited by the springs 14 when the coils of said springs close together or by the heads of the bolts 13 striking the support on which the mold frame rests.

In filling the mold the press member 15 will preferably be forced downwardly as far as possible thus exerting a maximum force to compress the meat. The mold may then be placed in a retort or cooker of any suitable form and the meat cooked while in the mold, the springs 14 maintaining the meat under a constant compression and expanding as the meat shrinks thus forming a solid and compact meat loaf.

The latch arms 19 being held inwardly by the springs 23 will automatically snap into engagement with successive ratchet teeth 22 as the press member is forced downwardly. In removing the press member, when the latch bars 21 are released from the ratchet teeth 22 as by moving the latch arms outwardly into the positions shown by dotted lines in Fig. 3 the springs 14 by their upward pressure will lift the press member out of the mold.

The meat loaves formed in this mold have square ends and are of substantially the same cross sectional shape as a loaf of bread so that in cutting slices of meat from said meat molds no small fragments need be removed in squaring up the ends as is customary with other forms of meat loaves and the slices cut from these meat loaves will conform to the shape of a loaf of bread thereby facilitating the making of a neat sandwich in which the meat will not protrude from the edges of the slices of bread.

The foregoing description clearly discloses what I now consider to be a preferred embodiment of my invention that it will be understood that this disclosure is merely illustrative and that such changes in the device may be made as are within the scope and spirit of the following claims.

I claim:

1. A meat mold embodying spaced apart U-shaped frame members, a centrally arranged tubular boss projecting upwardly from the base of each of said frame members, a rectangular meat receptacle mounted in said frame members, a concave bottom movably disposed in said meat receptacle, bolts secured to said bottom and guided for vertical movement in said bosses, compression springs on said bolts for urging said concave bottom upwardly, a press member arranged to be inserted into the top of said meat receptacle and readily releasable means operative on the exterior of said meat receptacle for holding said press member in said meat receptacle.

2. A meat mold embodying a plurality of spaced apart U-shaped frame members, a tubular boss projecting upwardly from the base of each of said frame members, a meat receptacle of rectangular shape open at both top and bottom and mounted in said frame members, a concave bottom movable in said meat receptacle, bolts secured to said concave bottom and guided in said tubular bosses, compression springs supporting said concave bottom, a relatively plane press member arranged to be inserted into the top of said meat receptacle, ribs on the top side of said press member, extensions projecting sidewise from said ribs, latch arms pivoted to said extensions, springs urging said latch arms inwardly, latch bars on the bottom ends of said latch arms and ratchet teeth on said U-shaped frame members with which said latch bars may engage.

JOSEPH KIPPER.